United States Patent

Eberle

[15] 3,681,388

[45] Aug. 1, 1972

[54] N-SUBSTITUTED-3-AMINOALKANOYL FUSED CYCLOALKYL INDOLES

[72] Inventor: Marcel K. Eberle, Madison, N.J.

[73] Assignee: Sandoz Wander Inc., Hanover, N.J.

[22] Filed: Dec. 4, 1970

[21] Appl. No.: 95,406

Related U.S. Application Data

[63] Continuation-in-part of Ser. No. 38,567, May 18, 1970, abandoned.

[52] U.S. Cl. ........260/326.5 B, 260/310 D, 260/315, 260/326.9, 424/274

[51] Int. Cl. .............................................C07d 27/54

[58] Field of Search ........................260/326.5 B, 315

[56] References Cited

UNITED STATES PATENTS 3,282,942  11/1966  Rice et al. ..............260/326.9 X

*Primary Examiner*—Alex Mazel
*Assistant Examiner*—Joseph A. Narcavage
*Attorney*—Gerald D. Sharkin, Frederick H. Wenfeldt, Robert S. Honor, Walter F. Jewell and Richard E. Vila

[57] ABSTRACT

N-substituted-3-aminoalkanoyl fused cycloalkyl[b]substituted indoles, e.g., 8-methyl-11-(3-aminobutanoyl)-cyclooct[b]indole hydrochloride, are prepared by treating a 2-phenyl or -2-(p-substituted phenyl)-4,5-substituted or unsubstituted-pyrazolidin-3-one with a cycloalkylanone. The compounds are useful as pharmaceutical agents, e.g., as sedative hypnotics, and as intermediates in the preparation of pharmaceutical agents.

11 Claims, No Drawings

N-SUBSTITUTED-3-AMINOALKANOYL FUSED CYCLOALKYL INDOLES

This application is a continuation-in-part of copending application Sr. No. 38,567, filed May 18, 1970, and now abandoned.

This invention relates to N-3-aminoalkanoyl fused cycloalkyl [b]indoles. More particularly it relates to N-substituted-3-aminoalkanoyl fused cycloalkyl[b]substituted indoles, acid addition salts thereof, and to processes for their preparation.

The compounds of this invention may be represented by the following structural formula:

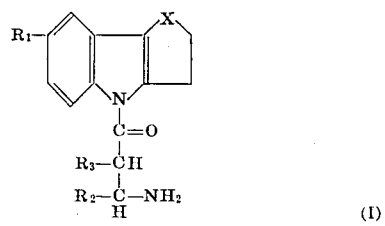

wherein
- $R_1$ is hydrogen, halo having an atomic weight of 19–36, lower alkyl having one to four carbon atoms, e.g., methyl, ethyl, propyl, isopropyl, butyl or isobutyl, or lower alkoxy having one to four carbon atoms, e.g., methoxy, ethoxy, propoxy, isopropoxy, butoxy or isobutoxy;
- $R_2$ is hydrogen or lower alkyl having one to four carbon atoms, e.g., methyl, ethyl, propyl, isopropyl, butyl or isobutyl,
- $R_3$ is hydrogen or methyl, provided that at least one of $R_2$ and $R_3$ is hydrogen, and
- X is $—(CH_2)_n—$ where $n$ is an integer of from 1 to 11; provided that when $R_1$ is halo, $R_2$ and $R_3$ must be hydrogen.

The compounds of formula (I) may be prepared by the following reaction scheme:

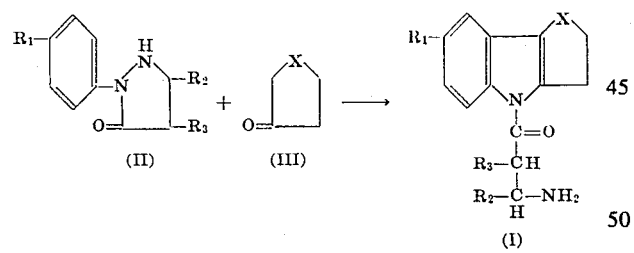

wherein $R_1$, $R_2$, $R_3$ and X have the above stated significance.

The compounds of formula (I) may be prepared by treating a compound of formula (II) in acid addition salt form, e.g., hydrochloride, hydrobromide or hydroiodide, with a compound of formula (III) in the presence of an inert gas, e.g., nitrogen. While a solvent is not necessary, the reaction is preferably carried out in an inert solvent such as lower alkanoic acids, e.g., glacial acetic acid, or propionic acid, lower alkanols having one to four carbon atoms, e.g., methanol, ethanol, propanol, isopropanol, butanol, or isobutanol or aromatic hydrocarbons, e.g., benzene, toluene or xylene, and the like. The reaction may be carried out at elevated temperature of from 60° to 160° C., preferably at the reflux temperature of the more preferred solvents, e.g., 70° to 120° C., for about 1 to 24 hours, preferably 2 to 4 hours. Neither the solvents used nor the temperature used are critical.

The compounds of formula (I) may be recovered using conventional techniques such as crystallization, and are most conveniently recovered in the form of an acid addition salt.

When the compounds of formula (I) are in free base form, the acid addition salt form, such as the hydrochloride, may be prepared by conventional methods such as suspending the free base compound in alcohol or water and treating with the appropriate acid. When it is desired to convert the acid addition salts to the corresponding free base, conventional techniques may be used, e.g., dissolution of the salt in water and precipitation using a base such as sodium hydroxide.

Certain of the compounds of formulas (II) and (III) are known and may be prepared according to methods disclosed in the literature. Those compounds of formulas (II) and (III) not specifically disclosed are prepared according to analogous methods from known materials.

The compounds of formula (I) are useful because they possess pharmaceutical properties in animals. More particularly, the compounds of formula (I) are useful as sedative-hypnotics as indicated by their activity in mice tested according to the 30 word adjective check sheet system basically as described by Irwin, S. (Gorden Research Conference, Medicinal Chemistry 1959) and Chen (Symposium on Sedative and Hypnotic Drugs, Williams and Wilkins, 1954).

The compounds of formula (I) where $R_1$ is halo and $n$ is 4 are also useful as anti-depressants as indicated by their ability to reverse reserpine hypothermia in mice (Spencer, S.S.J. Antagonism of Hypothermia in the mouse by Antidepressants, in, Antidepressant Drugs, p. 194–204, Eds. S. Garattini and M.N.G. Dukes, Excerpta Medica Foundation, 1967).

For the sedative-hypnotic and anti-depressant use the compounds may be administered orally or parenterally. The compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, and the organic acid salts, such as the succinate, benzoate, acetate, and the like.

The dosage administered for the sedative-hypnotic use may vary depending on the particular compound employed, the therapy desired and the severity of the condition being treated. In general, satisfactory results are obtained when administered at a daily dosage of from about 4 milligrams to about 600 milligrams per kilogram of animal body weight, preferably given in divided doses, two to four times a day, or in sustained release form. For most larger mammals (e.g., primates) the total daily dosage is from about 300 milligrams to about 2,500 milligrams of the compound and the dosage forms suitable for internal use comprise from about 75 milligrams to about 1,250 milligrams of active compound in intimate admixture with a solid or liquid pharmaceutically acceptable carrier or diluent.

The dosage administered for the anti-depressant use may vary depending on the particular compound employed, the therapy desired, and the severity of the condition being treated. However, in general, satisfactory results are obtained when administered at a daily dosage of from about 1 milligram to about 400 milligrams per kilogram of animal body weight, preferably given in divided doses two to four times a day, or in sustained release form. For most larger mammals (e.g., primates) the total daily dosage is from about 75 to about 1,500 milligrams. Dosage forms suitable for internal use comprise from about 20 to about 750 milligrams of the active compound, in intimate admixture with a solid or liquid pharmaceutically acceptable carrier or diluent.

The compounds of the formula I having the formula Ia:

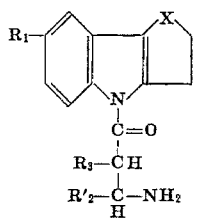

Ia in which $R_1$, $R_3$ and X are as above defined and $R'_2$ is hydrogen or methyl subject to the proviso that at least one of the $R'_2$ and $R_3$ is hydrogen, are also useful as intermediates in the preparation of pharmaceutically active compounds and for this purpose may be subjected to reduction to obtain compounds of the formula IV:

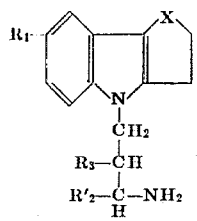

IV in which $R_1$, $R_3$, X and $R'_2$ are as above defined.

The preparation of compounds IV from compounds Ia is a reduction effected with diborane as the reducing agent. The reduction is suitably carried out at temperatures of from minus 20° to 50°C., preferably 0° to 30°C., and in the presence of an inert organic solvent, the reaction preferably being initiated at the lower range temperatures. The inert solvent employed is of conventional type, preferably an acyclic or cyclic ether, such as diethyl ether or, more preferably, tetrahydrofuran. The reduction is suitably effected employing the compound of the formula Ia in free base form and the resulting product of the formula IV is conveniently recovered in the form of an acid addition salt by working up by conventional procedures.

The compounds of the formula IV, in addition to possessing pharmaceutical activity, may also be used as intermediates in the preparation of pharmaceutically useful "alkylated" derivatives thereof of the formula V:

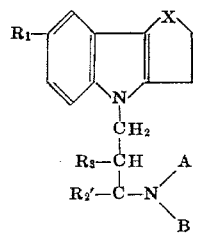

in which $R_1$, $R_3$, X and $R'_2$ are as above defined and in which:

a. one of A and B signifies a hydrogen atom and the other alkyl or hydroxyalkyl of one to four carbon atoms; or b. each of A and B independently are alkyl or hydroxyalkyl of one to four carbon atoms; or c. A and B together with the nitrogen atom to which they are attached form morpholino, piperidino, pyrrolidino or N-alkylpiperazino in which the N-alkyl is of one to four carbon atoms.

The conversion of the amino compounds of formula IV to their "alkylated" derivatives of the formula V essentially involves alkylation reactions. Such reaction may be generally carried out by conventional methods for alkylation of primary aliphatic amines. For example, various compounds which are substituted by other than hydroxyalkyl may be conveniently prepared by reacting the amino compound of formula IV with an alkyl halide of formula VI, $$Y-X' \qquad \text{VI}$$

in which

Y signifies a — $(CH_2)_4$—X′, —$(CH_2)_5$—X′, —$CH_2$—$CH_2$—O—$CH_2$-$CH_2$—X′, or —$CH_2$—$CH_2$—N(Alkyl of 1-4 carbon atoms)—$CH_2$—$CH_2$—X′ radical, and X′ signifies a chlorine, bromine or iodine atom.

This alkylation reaction is conveniently carried out in an inert organic solvent such as dioxane, benzene or toluene, or an excess of the alkyl halide of formula VI may be used as solvent. The reaction is suitably carried out at a temperature of from 20° to 200° C., preferably 50° to 150° C. It is desirable to carry out the reaction in the presence of an acid binding agent, such as a tertiary amine, e.g., triethylamine, or, preferably, an inorganic base, particularly an alkali metal carbonate, e.g., sodium or potassium carbonate. However, di-(identical alkyl)-substituted compounds of the formula V are preferably obtained by a process which comprises passing hydrogen through a mixture comprising an unsubstituted amine of formula IV, an aldehyde of one to four carbon atoms corresponding to the desired substituent, an inert organic solvent and a catalytic amount of platinum or palladium. Suitable reaction temperatures are about 0° to 50° C., preferably 10° to 30° C. Preferred solvents are alcohols corresponding to the aldehyde reactant and the preferred catalyst is platinum. When mono-alkyl or mixed alkyl substituents are desired, the amine of formula IV may be converted into an amide and the amide consequently reduced to give a mono-alkyl substituted product. The amide is preferably prepared by reacting the amine with the halide, especially the chloride, of a carboxylic acid of one to four carbon atoms corresponding to the desired substituent. The reaction may be carried out in an inert organic solvent. The reduction is carried out in conventional manner. Preferred reducing agents are lithium aluminum hydride and diborane and the preferred solvent is tetrahydrofuran. Suitable reduction temperatures are about 0° to 90° C., preferably 15° to 80° C. If desired, the "mixed alkylated" compounds may then be prepared by introducing the further alkyl substituent by reaction of the monoalkylated product with an aldehyde as described above or by formation of a further amide and consequent reduction. The compounds of formula V which are hydroxyalkyl substituted may be produced by reacting an amino compound of formula IV with an alkylene oxide in conventional manner for hydroxyalkylating primary aliphatic amines as described, for example, in U.S. Pat. No. 3,282,942.

The compounds of the formulae IV and V, of which many are already known from U.S. Pat. Nos. 3,282,942 and 3,329,571, are useful because they possess pharmaceutical activity in animals. In particular, the compounds of formula IV and their pharmaceutically acceptable acid addition salts exhibit central nervous system activity of a depressant order and are useful as sedatives and/or tranquilizers as indicated by behavior tests in mice on administration intraperitoneally. For such use the compounds may be combined with a pharmaceutically acceptable carrier, and such other conventional adjuvants as may be desirable, and administered orally in such forms as tablets, capsules, elixirs, suspensions and the like, or parenterally in the form of an injectable solution or suspension. The dosage administered will of course vary depending upon the compound used and mode of administration. However, in general, satisfactory results are obtained when administered at a daily dosage of from about 1 milligrams to about 200 milligrams per kilogram of body weight, preferably given in divided doses two to four times a day, or in sustained release form. For most mammals the administration of from about 50 milligrams to about 1,000 milligrams of the compound per day provides satisfactory results and dosage forms suitable for internal administration comprise from about 15 milligrams to about 500 milligrams of the compound in admixture with a solid or liquid pharmaceutical carrier or diluent.

The compounds of formula IV may also indicate their depressant effect on the central nervous system in one or more tests in animals indicative of their sedative/tranquilizer activity or of other useful activity associated with a depressive effect on the central nervous system. For example, various of the compounds of Formula I may exhibit an antagonism of amphetamine in mice and/or an anti-convulsant activity as indicated by an inhibition of chemically induced convulsions in mice. Such effects are also obtained on the administration of daily dosages in the range given above.

The compounds of formula V and their pharmaceutically acceptable acid addition salts also have pharmacological activity in animals as indicated by a depressant effect on the Central Nervous System in tests in mice, and are useful, for example, as sedatives and/or tranquilizers. The compounds of Formula V may be generally administered to obtain satisfactory results at daily dosages in the range of 0.3 to 200 milligrams per kilogram of animal body weight with daily doses for most mammals being in the range of from 15 milligrams to 1,000 milligrams in admixture with a solid or liquid pharmaceutical carrier or diluent. Compounds of formula V have also been found of value as anti-depressants and for other uses as indicated in U.S. Pat. Nos. 3,282,942 and 3,329,571.

The compounds of the formulae I, IV and V may be administered orally in such forms as tablets, dispersible powders, granules, capsules, elixirs, suspensions and syrups, or parenterally in the form of an injectable solution or suspension. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation for oral administration is a capsule prepared by standard techniques which contains the following:

| Ingredient | Parts by Weight |
| --- | --- |
| Compound of the formulae I, IV or V, e.g. 8-methyl-11-(3-aminobutanoyl)-cyclooct[b]indole in hydrochloride salt form | 100 |
| Pharmaceutically acceptable diluent (starch, kaolin or lactose) | 250 |

Another representative formulation is a tablet prepared by standard techniques which contains the following:

| Ingredient | Weight (mg.) |
| --- | --- |
| Compound of the formulae I, IV or V, e.g. 8-(3-aminopropyl)-cyclopent[b]indole in maleate salt form | 25–50 |
| Tragacanth | 10 |
| Lactose | 197.5 |
| Corn Starch | 25 |
| Talcum | 15 |
| Magnesium Stearate | 2.5 |

The following examples illustrate the invention:

EXAMPLE 1

8-Methyl-11-(3-aminobutanoyl)-cyclooct[b]indole and 8-Methyl-11-(3-aminobutyl)-cyclooct[b]indole.

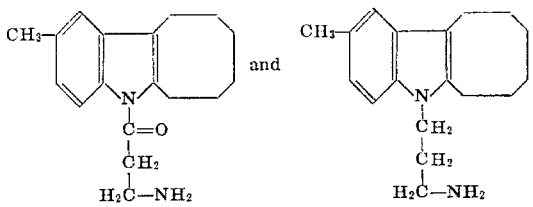

Part a. 8-methyl-11-(3-aminobutanoyl)-cyclooct[b]indole 4.5 g. of 2-(p-methylphenyl)-5-methyl-pyrazolone-3 hydrochloride and 4.0 g. of cyclooctanone in 20 ml. of glacial acetic acid are refluxed for 2 hours under an atmosphere of nitrogen. The resulting solution is cooled and diethyl ether is added to precipitate 8-methyl-11-(3-aminobutanoyl)-cyclooct[b]indole, m.p. in hydrochloride salt form 171°–173° C.

Part b. 8-methyl-11-(3-aminobutyl)-cyclooct[b]indole

The title product of a) above dissolved in water is added to diethyl ether. Dilute sodium hydroxide solution is added until the mixture is alkaline then the diethyl ether layer is separated, washed with water then dried over potassium carbonate. Excess ether is evaporated off to give the free amine as an oil. 4.5 g. of the free amine is dissolved in 50 ml. of absolute tetrahydrofuran and 50 ml. of a 1M solution of diborane in tetrahydrofuran is added. The mixture is left at room temperature overnight. The solvent is removed by evaporation under reduced pressure. The residue is dissolved in diethyl ether, and the solution is washed with 2N sodium carbonate solution and dried over sodium sulfate. Evaporation of diethyl ether leaves a liquid which is dissolved in ethanol and hydrogen chloride is bubbled through. Addition of anhydrous diethyl ether gives a precipitate which is filtered off, dissolved in ethanol and recrystallized by addition of anhydrous diethyl ether to obtain the title product, m.p. in hydrogen chloride salt form, 200° C.

EXAMPLE 2 a. Following the procedure of Part a) of Example 1, and in place of 2-(p-methylphenyl)-5-methyl-pyrazolone-3-hydrochloride, starting with
i. 2-(p-chlorophenyl)-pyrazolone-3 hydrochloride,
ii. 2-phenyl-5-methyl-pyrazolone-3 hydrochloride,
iii. 2-(p-methoxyphenyl)-5-methyl-pyrazolone-3 hydrochloride,
iv. 2-(p-methylphenyl)-pyrazolone-3 hydrochloride,
v. 2-phenyl-pyrazolone-3 hydrochloride,
the following compounds of formula I are obtained
 i. 8-chloro-11-(3-aminopropanoyl)-cyclooct[b]indole, m.p. in hydrochloride salt form, 197°–200° C.
 ii. 11-(3-aminobutanoyl)-cyclooct[b]indole, m.p. in hydrochloride salt form, 178°–181°C.
 iii. 8-methoxy-11-(3-aminobutanoyl)-cyclooct[b]indole, m.p. in hydrochloride salt form 172°–175° C.
 iv. 8-methyl-11-(3-aminopropanoyl)-cyclooct[b]indole, m.p. in hydrochloride salt form 196°–197° C.
 v. 11-(3-aminopropanoyl)-cyclooct[b]indole, m.p. in hydrochloride salt form 193°–195° C. respectively.

b. Following the procedure of Part b) of Example 1, and in place of 8-methyl-11-(3-aminobutanoyl)-cyclooct[b]indole, using the compounds of formula I set out immediately above, the following compounds of the formula IV are obtained:

i. 8-chloro-11-(3-aminopropyl)-cyclooct[b]indole, m.p. in hydrochloride salt form, 173°–175° C.
ii. 11-(3-aminobutyl)-cyclooct[b]indole, m.p. in hydrochloride salt form, 239°–240°C.
iii. 8-methoxy-11-(3-aminobutyl)-cyclooct[b]indole, m.p. in hydrochloride salt form, 185° C.
iv. 8-methyl-11-(3-aminopropyl)-cyclooct[b]indole,
v) 11-(3-aminopropyl)-cyclooct[b]indole, m.p. in hydrochloride salt form, 243°–245° C., respectively.

a. Following the procedure of Part a) of Example 1 and in place of 2-(p-methylphenyl)-5-methyl-pyrazolone-3, starting with 2-phenyl-5-methyl-pyrazolone-3, and in place of cyclooctanone, starting with
i. cyclopentanone
ii. cyclohexanone
iii. cycloheptanone
iv. cyclononanone
v. cyclodecanone
vii. cyclododecanone
the following products of formula I are obtained:
 i. 8-(3-aminobutanoyl)-cyclopent[b]indole hydrochloride,
 ii. 9-(3-aminobutanoyl-cyclohex[b]indole hydrochloride,
 iii. 10-(3-aminobutanoyl)-cyclohept[b]indole, m.p. in hydrochloride salt for 177°–180°C.
 iv. 12-(3-aminobutanoyl)-cyclonon[b]indole hydrochloride,
 v. 13-(3-aminobutanoyl)cyclodec[b]indole hydrochloride
 vi. 14-(3-aminobutanoyl)-cycloundec[b]indole hydrochloride, or
 vii. 15-(3-aminobutanoyl)-cyclododec[b]indole, m.p. in hydrochloride form 225°–226° C., respectively.

b. Following the procedure of Part b) of Example 1, and in place of 8-methyl-11-(3-aminobutanoly)-cyclooct[b]indole using the compounds of formula I set out immediately above, the following compound of the formula IV are obtained:
i. 8-(3-aminobutyl)-cyclopent[b]indole,
ii. 9-(3-aminobutyl)-cyclohex[b]indole,
iii. 10-(3-aminobutyl)-cyclohept[b]indole,
iv. 12-(3-aminobutyl-cyclonon[b]indole,
v. 13-(3-aminobutyl)-cyclodec[b]indole,
vi. 14-(3-aminobutyl)-cycloundec[b]indole,
vii. 15-(3-aminobutyl)-cyclododec[b]indole, respectively.

EXAMPLE 4

11-(3-dimethylaminopropyl)-cyclooct[b]indole

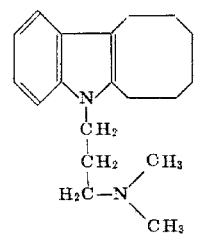

A solution of 1.4 g. of 11-(3-aminopropyl)-cyclooct[b] indole in 100 ml. methanol and 6 ml. of a 37 percent aqueous formaldehyde solution is hydrogenated in the presence of 500 mg. of platinum oxide over 2½ days. Removal of the solvent by evaporation in vacuo leaves an oil. The oil is dissolved in a minimum amount of methanol and treated with a methanolic solution of maleic acid. Diethyl ether is then added and the title compound precipitates in crystalline maleate salt form.

The maleate salt form is dissolved in methanol and the solution is treated with hydrogen chloride gas. Addition of diethyl ether causes the title compound to precipitate in crystalline hydrochloride salt form, m.p. 145° C.

What is claimed is:

1. A compound of the formula

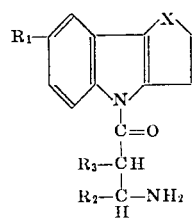

wherein
$R_1$ is hydrogen, halo having an atomic weight of 19 to 36, lower alkyl having one to four carbon atoms or lower alkoxy having one to four carbon atoms,
$R_2$ is hydrogen or lower alkyl having one to four carbon atoms,
$R_3$ is hydrogen or methyl, provided that at least one of $R_2$ and $R_3$ is hydrogen, and provided that when $R_1$ is halo, then $R_2$ and $R_3$ are hydrogen, and
X is $-(CH_2)_n-$ where $n$ is an integer of from 1 to 11,
or a pharmaceutically acceptable acid addition salt thereof.

2. The compound of claim 1 which is 8-methyl-11-(3—AMINOBUTANOYL)-cycloot[b]indole.

3. The compound of claim 1 which is 8-methyl-11-(3—AMINOPROPANOYL)-cyclooct[b]indole.

4. The compound of claim 1 which is 8-chloro-11-(3-aminopropanoyl)-cyclooct[b]indole.

5. The compound of claim 1 which is 11-(3-aminobutanoyl)-cyclooct[b]indole.

6. The compound of claim 1 which is 11-(3-aminopropanoyl)-cyclooct[b]indole.

7. The compound of claim 1 which is 8-methoxy-11-(3-aminobutanoyl)-cyclooct[b]indole.

8. The compound of claim 1 which is 10-(3-aminobutanoyl)-cyclhept[b]indole.

9. The compound of claim 1 which is 15-(3-aminobutanoyl)-cyclododec[b]indole.

10. The process for preparing a compound according to claim 1 in acid addition salt form which comprises treating a compound of the formula

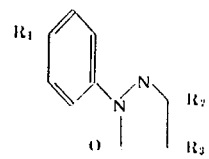

in acid addition salt form,
with a compound of the formula

wherein $R_1$, $R_2$, $R_3$ and X are as defined in claim 1.

11. The method of preparing a compound of the formula:

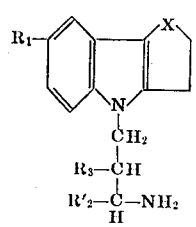

wherein $R'_2$ is hydrogen or methyl and $R_1$, $R_3$ and X are as defined in claim 1, comprising reducing a compound of the formula:

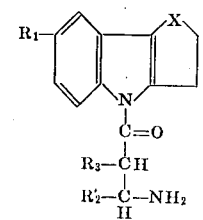

wherein $R'_2$, $R_1$, $R_3$ and X are as above defined, with diborane at a temperature in the range of from minus 20°C. to plus 50°C.

* * * * *